(12) United States Patent
Quispe Ramon

(10) Patent No.: US 12,416,346 B1
(45) Date of Patent: Sep. 16, 2025

(54) VARIABLE DENSITY FLYWHEEL ASSEMBLY

(71) Applicant: Enrique Alberto Quispe Ramon, Lima (PE)

(72) Inventor: Enrique Alberto Quispe Ramon, Lima (PE)

( * ) Notice: Subject to any disclaimer, the term of this patent is extended or adjusted under 35 U.S.C. 154(b) by 3 days.

(21) Appl. No.: 18/378,730

(22) Filed: Oct. 11, 2023

(51) Int. Cl.
*F16F 15/31* (2006.01)
*F16F 15/16* (2006.01)

(52) U.S. Cl.
CPC .............. *F16F 15/31* (2013.01); *F16F 15/16* (2013.01)

(58) Field of Classification Search
None
See application file for complete search history.

(56) References Cited

U.S. PATENT DOCUMENTS

| | | |
|---|---|---|
| 3,248,967 A | 5/1966 | Lewis |
| 3,970,409 A | 7/1976 | Luchuk |
| 4,335,627 A * | 6/1982 | Maxwell ................ F16F 15/31 416/169 R |
| 5,269,197 A | 12/1993 | Yang |
| 6,883,399 B2 | 4/2005 | Burstall |
| 8,056,914 B2 | 11/2011 | Kalil |
| 9,206,785 B2 | 12/2015 | Poole |
| 10,247,262 B2 | 4/2019 | Arduini |
| 10,487,913 B2 | 11/2019 | Galiana Dominguez |
| 10,899,217 B2 | 1/2021 | Dugas |
| 2009/0320640 A1 | 12/2009 | Elliot et al. |
| 2016/0025067 A1 * | 1/2016 | Pristash ................ F03D 3/0427 290/55 |
| 2016/0116021 A1 | 4/2016 | Jacobson |
| 2019/0211802 A1 | 7/2019 | Arduini |

* cited by examiner

*Primary Examiner* — Vicky A Johnson
(74) *Attorney, Agent, or Firm* — MALLOY & MALLOY, P.L.

(57) ABSTRACT

A flywheel assembly having a variable density dependent at least partially upon an amount of liquid contained therein includes a housing having an at least partially hollow interior. A shaft is connected to the housing and rotational therewith and is operatively associated with both a liquid input and a vent assembly, each connected in fluid communication with the hollow interior. The liquid input is operative to direct liquid into and out of the hollow interior and the vent assembly is operative to direct airflow out of and into said hollow interior, respectively concurrent to said liquid flow into and out of said hollow interior, via said liquid input.

19 Claims, 4 Drawing Sheets

VARIABLE DENSITY FLYWHEEL ASSEMBLY

BACKGROUND OF THE INVENTION

Field of the Invention

The present invention is directed to a flywheel assembly structured to operate at various densities based on a variable amount of liquid being supplied to and removed from an interior of a flywheel housing.

DESCRIPTION OF THE RELATED ART

A flywheel is a rotating disk or other structure capable of rotation and used as a kinetic energy storage device. As such, flywheels resist changes in the rotational speed due to inertia. The inertia of a flywheel serves to steady the rotation of another mechanical device when a periodic torque is exerted on that mechanical device. The flywheel absorbs excess energy when the torque of the mechanical device operatively associated with the flywheel is exerted on the flywheel.

By way of nonlimiting example, when a flywheel is operatively associated with an engine the flywheel absorbs excess energy when engine torque is momentarily larger than that needed to service the load on the engine. In cooperation therewith, the flywheel releases energy when there is a momentarily increase in the load which requires more power than produced by the engine. Absorption and release of energy by the flywheel serves to prevent the fluctuation of engine speed in response to momentary changes in load.

Accordingly, the kinetic energy of the flywheel increases linearly with the moment of inertia. The moment of inertia describes the ability of the flywheel to resist changes in its angular velocity. Further, as the mass of a flywheel is increased, its moment of inertia and therefore the kinetic energy stored therein increases. In contrast, as the mass of the flywheel decreases the moment of inertia decreases and engine torque output may become unstable. When the mass of the flywheel is increased, the torque output of the engine stabilizes.

However, the acceleration characteristic of an engine deteriorates with increasing flywheel mass. Therefore, with a flywheel having constant mass, the greater the distance of the mass from the axis of rotation of the flywheel, the greater is the moment of inertia of the flywheel. Conversely, the lesser the distance of the mass from the axis of rotation, the lower is the moment of inertia of the flywheel.

Many conventional flywheels are structured to include a fixed structure such that the inertia mass is permanent and the dynamic energy absorption would make rotational speed increasing and energy release would reduce the rotational speed of the flywheel. However, another category of known or prior art flywheel structures are operative to produce variable inertia. By way of nonlimiting example, variable inertia flywheels may be used in power generation apparatus to quickly release kinetic energy to meet transient power load demands. Such variable inertia flywheels typically vary inertia by mechanically/physically moving a mass connected to the flywheel relative to the axis of rotation.

Accordingly, variable inertia flywheels may be utilized in rotating machinery to store energy, wherein such stored energy may be quickly released based on a sudden energy demand. Such category of flywheels may incorporate movable/adjustable solids or other devices. However, the more moving parts any apparatus has, the greater the chance of failure during its operation. Additionally, known mechanical and electro-mechanical arrangements lack responsiveness when dealing with a sudden increase in demand for power.

To overcome such disadvantages, another category of flywheels involves the transfer of fluid relative to an axis of rotation of the flywheel thereby at least partially eliminating any problems associated with multiple moving parts, as set forth above. Therefore, it is recognized that in many practical applications, it may be desirable to accommodate the changing moment of inertia requirements of the flywheel at different operating speeds, using a variable moment of inertia flywheel or a flywheel having a variable density.

SUMMARY OF THE INVENTION

The present invention is directed to a flywheel assembly structured to be operative with a variable density. The flywheel assembly includes a housing including a hollow interior, wherein the housing preferably comprises two housing segments connected to one another and collectively defining the boundaries of the hollow interior. The housing and accordingly at least one, but preferably both, of the two housing segments include a predetermined configuration which facilitates the filling and emptying of the hollow interior of the housing with a liquid such as water. As should be apparent, since the amount of water within the interior of the housing may vary, the density of the flywheel assembly may vary. Further, the predetermined configuration of the housing, including the two housing segments, may be at least partially conical. As such, one or both housing segments May have a conical configuration defined by an annular and/or circular circumference.

The predetermined configuration of the housing is also at least partially defined by the two housing segments connected to one another adjacent correspondingly disposed and attached circumferences, in sealing engagement with one another. Moreover, the sealing connection of the adjacently disposed circumferences of the two housing segments results in a substantially "reversed" orientation. Accordingly, in one embodiment the predetermined configuration of the housing and the substantially, but not necessarily, equivalent configuration of the two housing segments determines the disposition of the interconnected circumferences in a substantially horizontal orientation. Further, the interconnected circumferences of the two housing segments will define a diameter of the housing being disposed in the substantially horizontal orientation.

In addition, at least one embodiment of the flywheel assembly further includes a central shaft connected to the housing and extending through the interior thereof in coincident relation to the longitudinal axis and in substantially perpendicular relation to the aforementioned diameter defined by the interconnected circumferences. The shaft includes a central channel extending along the interior of at least a portion and in some embodiments along substantially the entirety of the shaft length. The length of the shaft is such as to have opposite ends thereof extending outwardly from the reversely oriented, connected housing segments. The opposite ends are cooperative with other functional and structural components of the flywheel assembly as explained in greater detail hereinafter.

At least one embodiment of the flywheel assembly includes a liquid input connected to the shaft, wherein at least portions thereof are rotatable with the shaft concurrent to rotation of the housing and the shaft. The liquid input includes a liquid seal structured and disposed to prevent or at least significantly restrict leakage of liquid from the interior of the housing, the central interior channel of the shaft, and the correspondingly opposite end of the shaft. Such liquids will be restricted or prevented when the hollow interior of the housing is filled, and the process of being filled or emptied. In addition, the liquid input may include a liquid flow conduit, tubing, piping, etc. connected in fluid communication with the liquid seal and disposed within and extending along at least a portion of the interior channel of the shaft. Further, the liquid flow conduit is in direct communication with the interior of the housing through the provision of least one or a plurality of liquid ports. The one or more liquid ports may be connected directly to the shaft and/or extend therethrough. The one or more liquid ports are disposed to direct liquid flow both into the hollow interior and outwardly therefrom, via the interior of the liquid flow conduit of the liquid input.

The flywheel assembly of the present invention further includes and/or is operative with a liquid supply, preferably but not necessarily, water. In addition, a liquid drive structure such as, but not limited to a liquid pump is disposed in direct communicating relation with the liquid supply. The liquid drive structure or liquid pump may be of reversed polarity or otherwise be structured for operation in a manner which forces water from the liquid supply into the hollow interior of the housing as well as evacuate or remove water from the interior of the housing, thereby at least partially describing the operative characteristics of at least one embodiment of the flywheel assembly of the present invention. As should be apparent and as will be discussed in greater detail hereinafter, liquid or water supply into the hollow interior of the housing and removal therefrom will be by means of the aforementioned inlet port including the liquid flow conduit and the one or more liquid ports.

In at least one embodiment, the flywheel assembly comprises a control facility including a central processing unit which in turn is operatively connected to a timer facility and/or wherein a timer facility is integrated in the central processing unit. Therefore, the operation of the flywheel assembly, including at least the filling and emptying of water relative to the hollow interior as well as the rotation of the flywheel assembly may be preprogrammed and or performed on a scheduled basis. Such preprogrammed or scheduled operation of the flywheel assembly, including rotation of the housing and shaft, may depend, at least in part, on the practical application (machinery, generator, engine, etc.) with which the flywheel assembly is utilized. Alternatively, the central processing unit may be manually controlled and/or activated thereby allowing a selective, variable filling, emptying of the housing and rotation thereof as well. In such a latter embodiment, the necessity for utilizing the timer assembly may be reduced or eliminated.

At least one embodiment of the flywheel assembly includes a vent assembly connected to the housing in fluid communication with the hollow interior thereof. The vent assembly is operative to define airflow out of and into the hollow interior, respectively concurrent to liquid or water flow into and out of the hollow interior. Therefore, during a filling of the hollow interior of the housing with a certain amount of liquid, which at least partially defines the density of the housing, airflow will pass through the vent assembly from the hollow interior to an exterior thereof. In contrast, upon an emptying or removal of the liquid from within the hollow interior, there will be a tendency to establish a negative pressure within the housing interior. Accordingly, the vent assembly is structured to draw air there through into the housing interior in response to and compensation of the negative pressure.

Structural and operative features of the vent assembly include a base having an interior cavity or compartment as well as an access port. The access port is disposed to establish fluid communication between the interior cavity of the base and the exterior thereof as well as the exterior of the housing. The vent assembly further includes an airflow conduit disposed within the interior channel at the corresponding opposite end of the shaft. The airflow conduit is concurrently disposed in fluid communication with the access port, as well as the hollow interior of the housing. Such fluid communication is facilitated by the provision of at least one but preferably a plurality of conduit segments. The one or more conduit segments are connected to or mounted on the shaft and disposed in fluid communication between the hollow interior of the housing and the interior cavity of the base.

One preferred embodiment of the flywheel assembly includes an overflow assembly structured and disposed to prevent or significantly restrict an overflow or passage of liquid from the hollow interior of the housing to an exterior thereof, such as through the aforementioned access port and/or vent assembly. In at least one embodiment, the overflow assembly is cooperative in both operation and structure with the vent assembly. This is due in part by virtue of the access port in the base being disposed in in fluid communication between the interior cavity of the base and the exterior thereof. In one embodiment, the overflow assembly may comprise a valve structure, which is at least partially defined by the access port and a liquid seal member. The liquid seal member is movably disposed within the interior cavity of the base and is formed of a material which is capable of floating and/or being disposed in an aligned, sealing engagement with the access port upon a filling of the interior cavity of the base by overflow liquid from the housing interior.

Therefore, the structural and operative features of the overflow assembly include the movable liquid seal member rising upwardly into the aforementioned sealing engagement with the access port upon liquid or water inadvertently and/or forcibly passing into the interior cavity. It is of note that the configuration of the interior surface of the base cavity may be such as to effectively direct the movable liquid seal member into the aligned, sealing relation to the access port, while remaining within the interior of the base. Such preferred configuration of the interior surface may be spherical or at least partially spherical or otherwise configured to accomplish such direct, sealing registry and engagement between the liquid seal member and the interior opening of the access port.

Moreover, when the vent assembly and the overflow assembly are cooperatively structured and disposed in the manner set forth above, within the interior cavity of the base, the overflow assembly as well as a vent assembly further includes a seal member retainer. The seal member retainer is disposed within the interior cavity of the base and includes an apertured or otherwise liquid and air permeable construction. Such a fluid permeable construction allows both air and liquid to pass therethrough between the access port and the hollow interior of the housing, via the airflow conduit and one or more conduit segments. Such an apertured construction may be the form of a mesh or screen material or otherwise be structured to include sufficiently disposed and dimensioned apertures, which facilitate fluid flow therethrough. However, such apertures are dimensioned, such as being sufficiently smaller, to restrict passage of the movable airflow seal member therethrough into a sealing engagement or position between the interior of the cavity and the hollow interior of the housing.

Therefore, during intended operation of the vent assembly and a concurrent at least partial filling of the housing interior with liquid, air within the housing will flow through the airflow conduit and one or more conduit segments into the interior cavity of the base and outwardly therefrom through the access opening. The force of pressure exerted on the movable liquid seal member by the passage of air through the interior cavity of the base will not be sufficient to establish and maintain a continuous sealing engagement between the liquid seal member and the interior opening of the access port. Also because of the apertured construction of the retainer, air can freely pass therethrough into the interior cavity of the base and outwardly therefrom through the access port.

However, in the event that in excess of amount of water is delivered to the interior of the housing, resulting in an overflow of liquid passing through the airflow conduit and conduit segments into the interior of the base, the liquid seal member will float or otherwise be forced into the aforementioned sealing engagement with the access port. Such sealing engagement will prevent or significantly restrict the overflow of liquid from passing through the access port, from the interior of the base, to an exterior thereof.

In contrast, when liquid is removed from the hollow interior of the housing, air will be drawn from the exterior of the housing and base, through the access port, into and through the airflow conduit and one or more conduit segments into the interior of the housing. During this emptying procedure the disposition and apertured construction of the retainer will prevent the liquid seal member from passing beyond the retainer into a sealing relation with the airflow conduit of the vent assembly. In turn, airflow through the access port and interior of the base will continue into the interior of the housing until the emptying of liquid from the housing is completed.

Therefore, the structure and operative features of the variable density flywheel assembly of the present invention allow the filling of the hollow interior of the housing with different quantities of liquid thereby allowing the density of the housing to be varied. Such varied density will result in a variable inertia and resulting kinetic energy upon rotation of the housing in accord with the demands and requirements of the practical application (machinery, generator, mechanical linkage, engine, etc.) with which the flywheel assembly of the present invention is operatively associated.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is directed to a flywheel assembly, generally indicated as 10 throughout the Figures, structured to be operative at variable densities. The flywheel assembly 10 includes a housing 12 including a hollow interior 14, wherein the housing 12 preferably comprises two housing segments 16 and 18 connected to one another and collectively defining the boundaries of the housing interior 14. It is emphasized that the housing 12 may assume a variety of different configurations. However, in at least one embodiment, the housing 12 and accordingly at least one, but preferably both, of the two housing segments 16 and 18 include a predetermined configuration which facilitates the filling and emptying of the interior 14 of the housing 12 with a liquid such as, but not limited to, water. As should be apparent the amount of liquid or water supplied to the housing interior 14 determines the density and accordingly the inertia of the flywheel assembly 10 as it rotates. It should be apparent, since the amount of water supplied to the interior 14 of the housing 12 may vary, the density of the flywheel assembly 10 may vary. Further, the predetermined configuration of the housing 12, including the two housing segments 16 and 18, may be at least partially conical, as represented throughout the Figures. As such, one or both housing segments 16 and 18 may have a conical configuration defined by an annular and/or circular circumference 16' and 18'.

Figure 1:
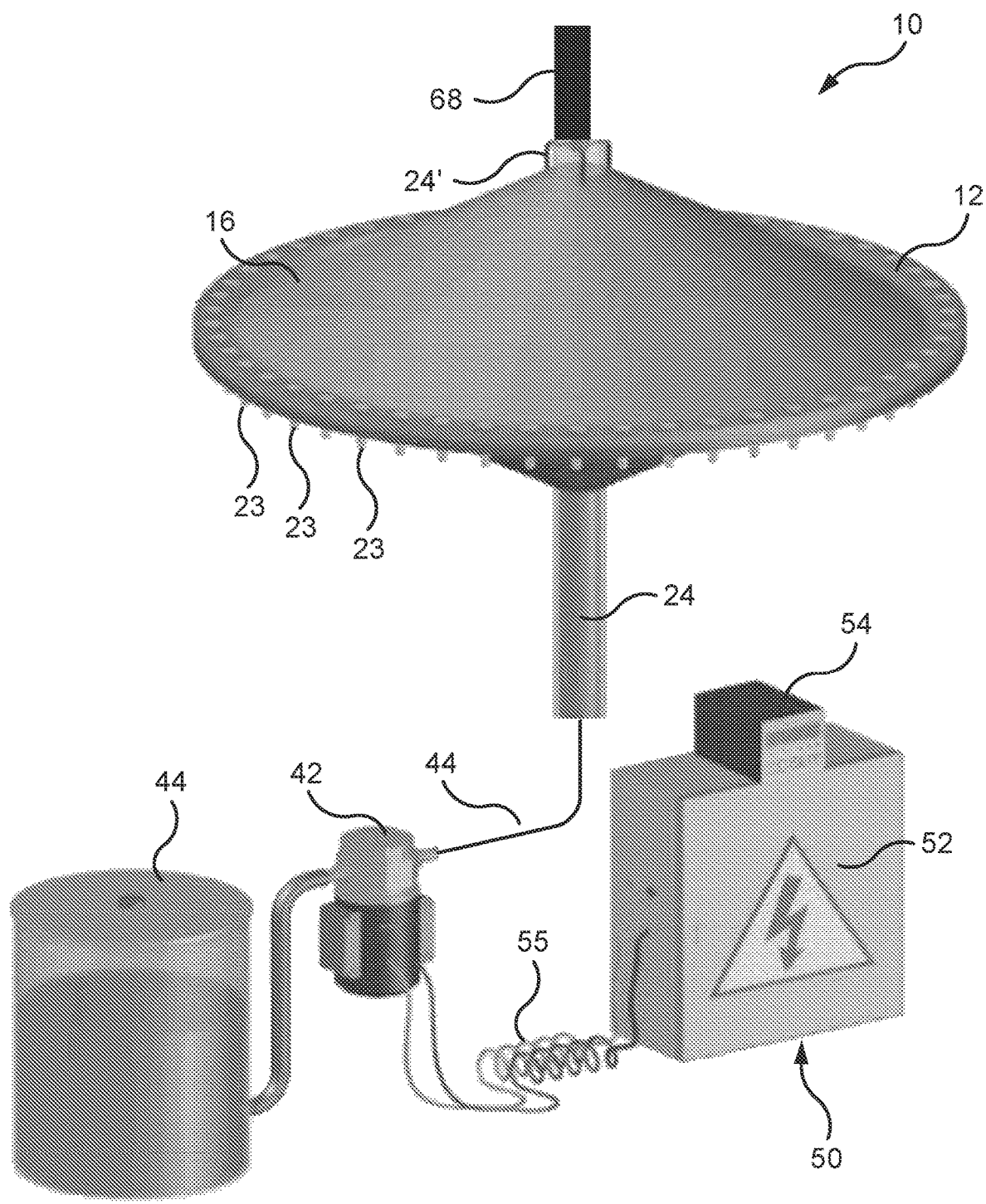
FIG. 1 is a perspective view in partial schematic form of one embodiment of the present invention.
Figure 2:
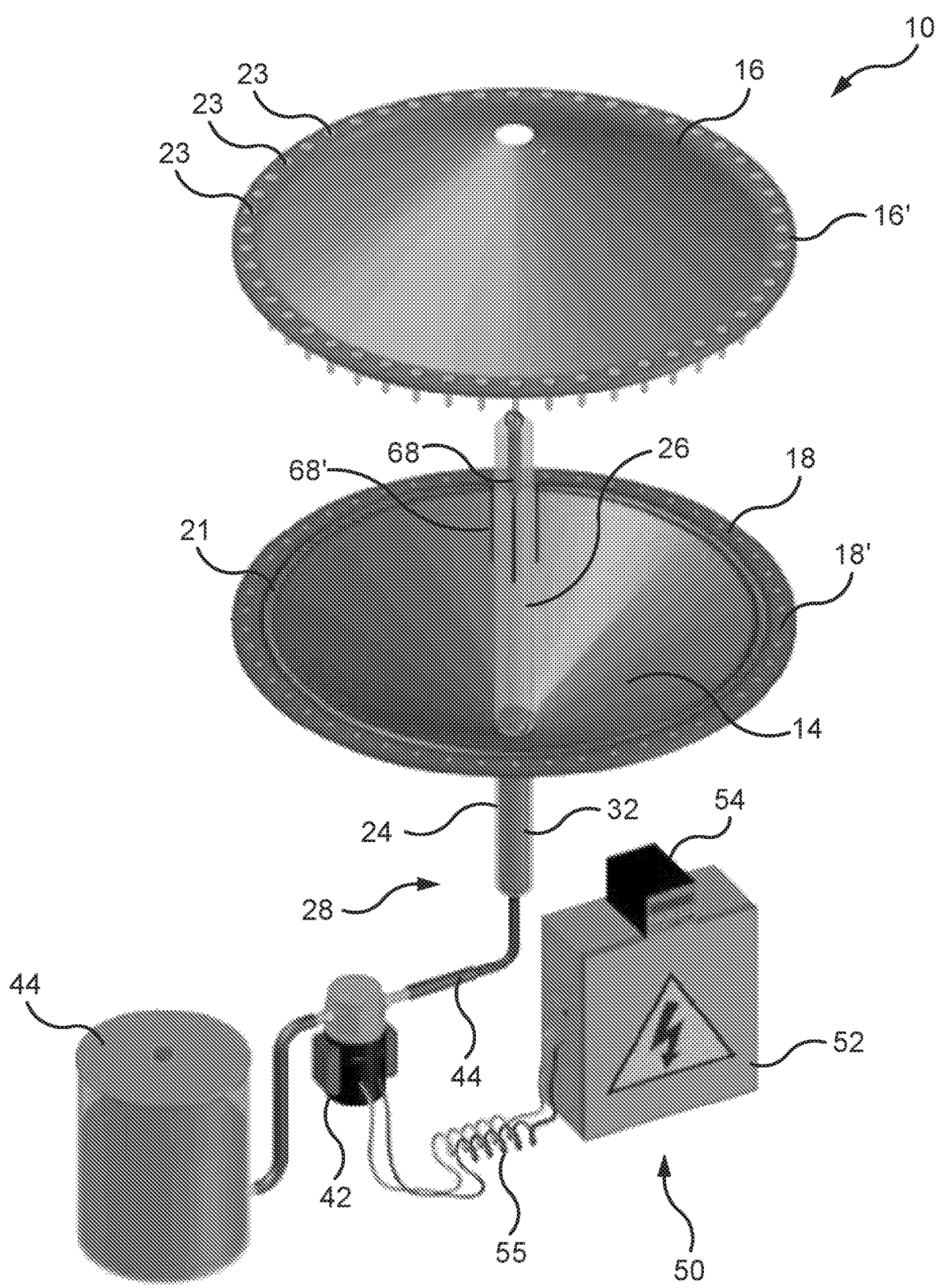
FIG. 2 is an exploded perspective view of the embodiment of FIG. 1 in partially disassembled form.
Figure 3:
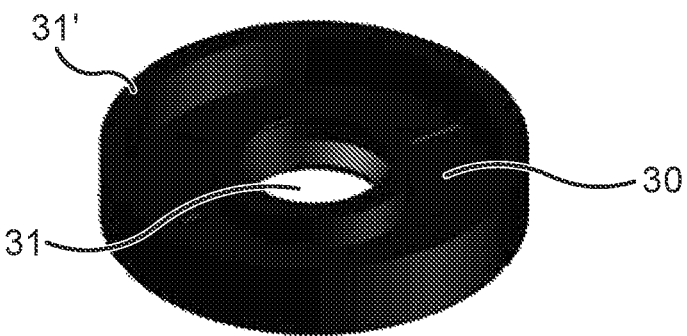
FIG. 3 is a perspective interior detail view of the embodiment of FIGS. 1 and 2.
Figure 6:
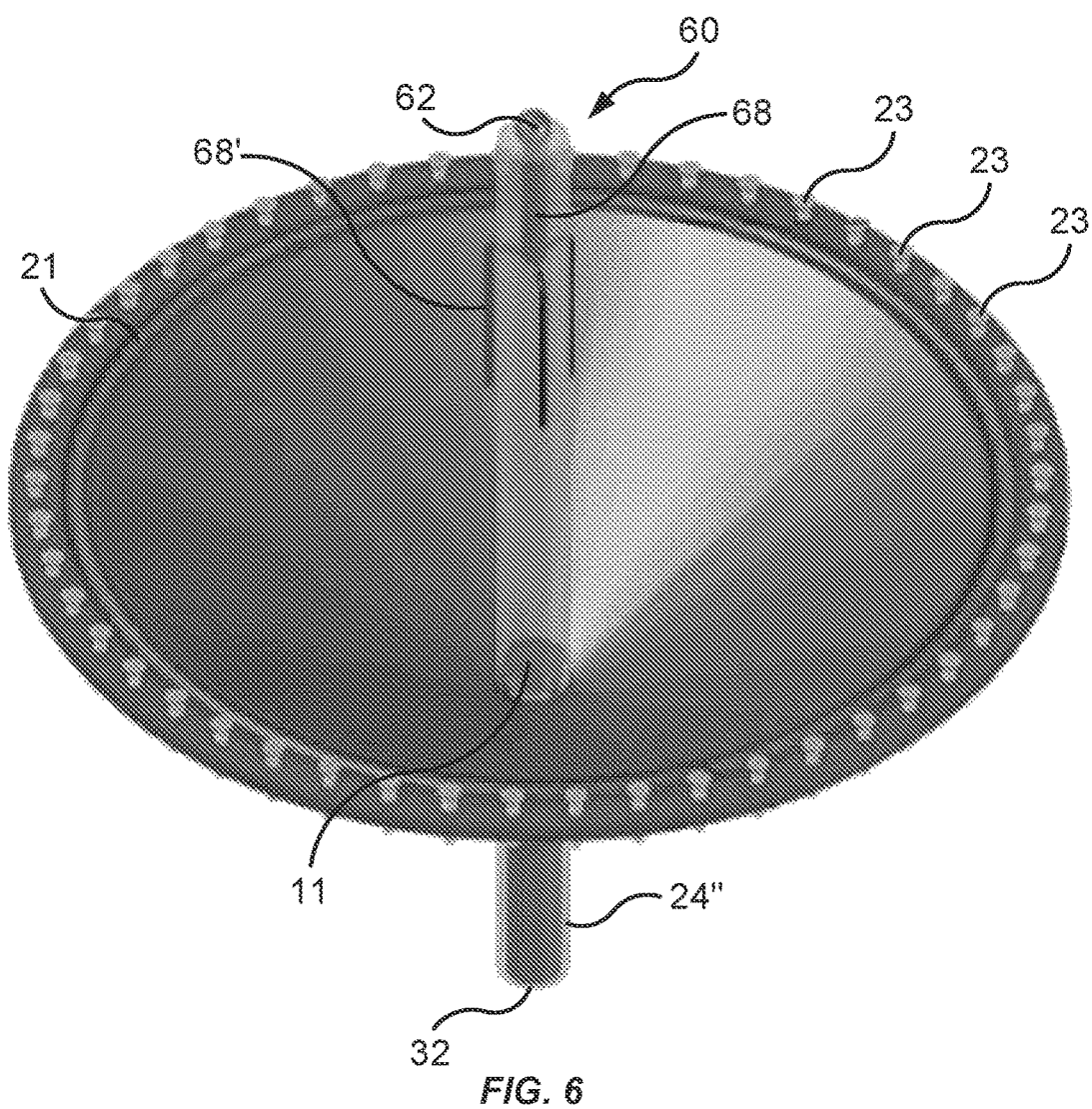
FIG. 6 is a perspective detail interior view in partially assembled form of a portion of the embodiment of FIGS. 1-4.

The predetermined configuration of the housing 12 is also at least partially defined by the two housing segments 16 and 18 connected to one another adjacent correspondingly disposed and attached circumferences 16' and 18', in sealing engagement with one another. Such sealing engagement and/or connection is at least partially accomplished through the provision of an annular or circular sealing ring (O-ring) 21, as represented in FIGS. 2, 3 and 6. Moreover, the sealing connection 21 of the adjacently disposed circumferences 16' and 18' of the two housing segments 16 and 18 results in a substantially "reversed" orientation. Accordingly, in one embodiment the predetermined configuration of the housing 12 and the substantially, but not necessarily, equivalent configuration of the two housing segments 16 and 18 determines the disposition of the interconnected circumferences 16' and 18' in a substantially horizontal orientation. Further, the interconnected circumferences 16' and 18' will define a diameter of the housing being disposed in the substantially horizontal orientation, as represented throughout the Figures. As also clearly represented, the attachment of the circumferences 16' and 18' may be accomplished by a plurality of spaced apart connectors 23.

As will be explained in greater detail hereinafter, the operation/rotation of the housing 12 and a substantially upright orientation, wherein the diameter/connected circumferences 16' and 18' are substantially horizontally oriented is not a mere matter of design choice but facilitates the filling and emptying of the housing interior 14.

In addition, at least one embodiment of the flywheel assembly 10 further includes a central shaft 24 connected to the housing 12 and extending through the interior 14 in coincident relation to the longitudinal axis of the housing 12 and in substantially perpendicular relation to the plane of the diameter, defined by the interconnected circumferences 16' and 18'. The shaft 24 includes a central channel 26 extending along the interior of at least a portion and in some embodiments along substantially the entirety of the length of the shaft 24. The length of the shaft 24 is such as to have opposite ends 24' in 24" thereof extending outwardly from the reversely oriented, connected housing segments 16 and 18. These opposite ends 24' in 24" are cooperative with other functional and structural components of the flywheel assembly 10, as explained in greater detail hereinafter.

Figure 4:
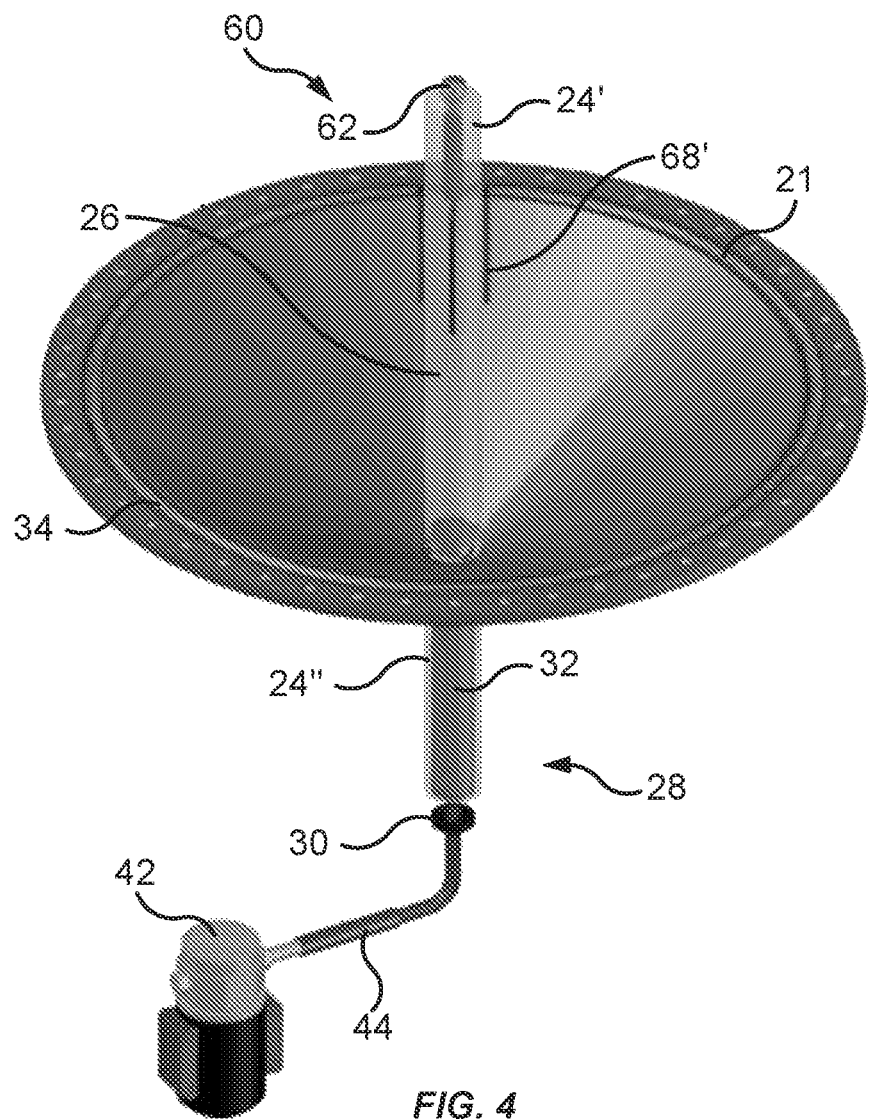
FIG. 4 is a perspective detail view of one component associated with liquid input of the embodiment of FIGS. 1-3.

At least one embodiment of the flywheel assembly 10 includes a liquid input, generally indicated as 28 connected to the shaft 24. The liquid input 28 includes liquid seal structured 30 disposed, such as by being press fit, into the interior of the end 24" of the shaft 24 to prevent or at least significantly restrict leakage of liquid from the interior 14 of the housing 12, the central interior channel 26 of the shaft 24, and the correspondingly opposite end 24" of the shaft 24. As best represented in FIG. 4, the liquid seal 30 includes a central aperture 31 having an interior surface 31' specifically and cooperatively structured with the exterior of the conduit 32 and/or opposite end 24" to facilitate rotation of the shaft 24 relative to the liquid seal 30. As a result, leakage of the liquid will be restricted or prevented when the hollow interior 14 of the housing 12 is filled, in the process of being filled or in the process of being emptied. In addition, the liquid input 28 may include a liquid flow conduit 32, in the form of tubing, piping, etc. connected in fluid communication with the liquid seal 30 and disposed within and extending along at least a portion of the interior channel 26, within the opposite end 24" of the of the shaft 24. Further, the liquid flow conduit 32 is in direct fluid communication with the housing interior 14 through the provision of least one or a plurality of liquid ports 34, as best represented in FIG. 3. The one or more liquid ports 34 may be connected directly to the shaft 24 and/or extend therethrough into the housing interior 14. The one or more liquid ports 34 are disposed and structured to direct liquid flow both into the housing interior 14 as well as outward from the housing interior 14, via the interior of the liquid flow conduit 32, respectively during a filling and emptying of the housing interior 14.

As indicated here in the disposition of the one or more liquid ports 34 at the effective lowest point or bottom of the housing segment 18 serves to facilitate the collection of liquid within the housing interior 14 during and emptying of the housing 12. Due to the fact that the interior surface of the housing segment 18 is substantially conical and/or slopes towards the one or more liquid ports 34, liquid or water within the housing interior 14 will be collected adjacent to and in direct fluid communication with the one or more liquid ports 34. The disposition of the liquid ports 34 in the manner set forth herein and described immediately above also provides an indication of why the housing must rotate in an upright orientation such that the diameter, defined by the connected circumferences 16' and 18' are disposed in a substantially horizontal orientation. If otherwise oriented, water within the housing would not flow, at least partially due to gravity, towards and into the aforementioned direct fluid communication with the one or more liquid ports.

The flywheel assembly 10 further includes and/or is operative with a liquid/water supply 40. In addition, a liquid drive structure 42 such as, but not limited to a liquid pump is disposed in direct communicating relation with the liquid supply 40. The liquid drive structure or liquid pump 42 may be electrically powered, using AC or DC current. Further, the liquid pump 42 may be of reversed polarity or otherwise be structured for operation in a manner which facilitates both the filling and emptying of the housing interior 14 by forcing water from the liquid supply 40 into the housing interior 14. Alternatively, the liquid pump 42 may be operative to empty or remove water from the housing interior 14, back into the liquid supply 40. Such reversible operative features at least partially describe the operative characteristics of at least one embodiment of the flywheel assembly 10, which in turn facilitates establishing a variable density of the flywheel assembly 10 by filling and emptying the housing 12 with different amounts of liquid/water. As should be apparent and as will be discussed in greater detail hereinafter, liquid or water supply into the hollow interior of the housing and outwardly therefrom, will be by means of the inlet input 28, including the one or more liquid ports 34, liquid flow conduit 32 liquid seal 30 and interconnecting lines 44, which may be tubing, piping, etc.

In at least one embodiment, the flywheel assembly 10 comprises a control facility 50 including a central processing unit (CPU) 52, which in turn is operatively connected to a timer facility 54 and/or wherein a timer facility 54 is integrated in the central processing unit 52. Therefore, the operation of the flywheel assembly 10, including at least the filling and emptying of water relative to the housing interior 14, as well as activating a rotational drive (not shown for purposes of clarity) of the flywheel assembly 10 may be preprogrammed and or performed on a scheduled basis. Such preprogrammed or scheduled operation of the flywheel assembly 10, including rotation of the housing 12 and shaft 24, may depend, at least in part, on the practical application (machinery, generator, engine, etc.) with which the flywheel assembly 10 is utilized and operatively connected. Alternatively, the central processing unit 52 may be manually controlled and/or activated thereby allowing a selective, variable filling and emptying of the housing 10 and rotation thereof. In the latter embodiment, the necessity for utilizing the timer assembly 54 may be reduced or eliminated. In either embodiment the CPU 52 may be electrically connected to the liquid pump 42 by appropriate conductive connections 55, wherein the CPU 52 may be electrically powered from an appropriate power source using AC or DC current.

Figure 5:
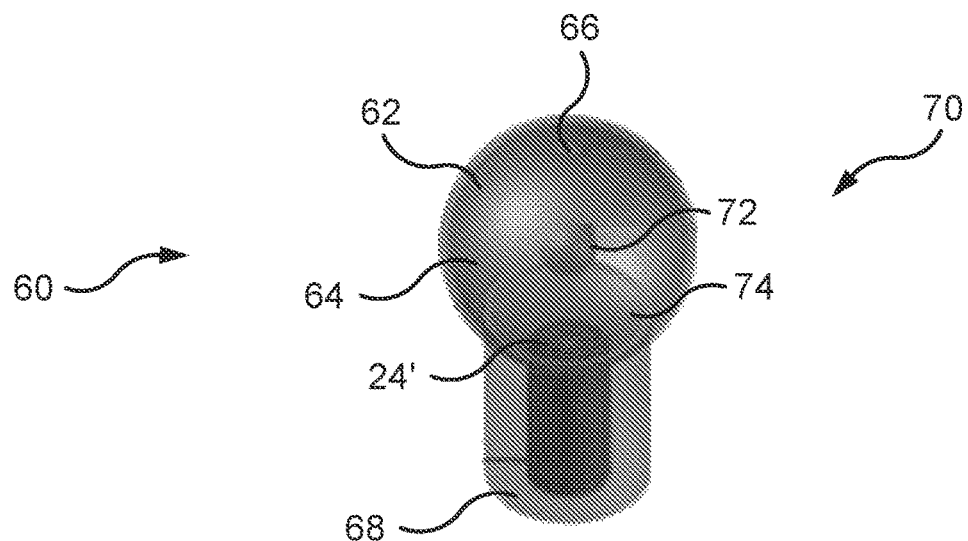
FIG. 5 is a detail view of a vent assembly operatively associated with the embodiment of FIGS. 1-4.

At least one embodiment of the flywheel assembly 10 includes a vent assembly 60, as represented in at least FIGS. 3, 5 and 6. The vent assembly 60 is connected in fluid communication with the housing interior 14. The vent assembly 60 is operative to establish airflow both out of and into the hollow interior 14, respectively, concurrent to liquid or water flow into and out of the housing interior 14. More specifically, during a filling of the housing interior 14 with a predetermined amount of liquid, thereby at least partially defining the density of the housing, airflow will pass through the vent assembly 60 from the housing interior to an exterior thereof. In contrast, upon an emptying or removal of the liquid from the housing interior 14, there will be a tendency to establish a negative pressure therein. Accordingly, the vent assembly 60 is structured to draw air there through into the housing interior 14 in order to compensate for such negative pressure.

Structural and operative features of the vent assembly include a base 62 having an interior cavity or compartment 64 as well as an access port 66. The access port 66 is disposed to establish fluid communication between the interior cavity 64 of the base 62 and the exterior thereof as well as the exterior of the housing 12. The vent assembly 60 further includes an airflow conduit 68 disposed within the interior channel 26 at the corresponding opposite end of the shaft 24'. The airflow conduit 68 is concurrently disposed in fluid communication with the access port 66, as well as the housing interior 14. Such fluid communication is facilitated by the provision of at least one but preferably a plurality of conduit segments 68'. The one or more conduit segments 68' are connected to or mounted on the shaft 24 within the housing interior 14 and disposed in fluid communication between the housing interior 14 and the interior cavity 64 of the base 62, as well as the access port 66.

One preferred embodiment of the flywheel assembly 10 includes an overflow assembly 70 structured and disposed to prevent or significantly restrict an overflow or passage of liquid from the housing interior 14 to an exterior thereof, such as through the access port 66 and/or vent assembly 60. In at least one embodiment, the overflow assembly 70 is disposed, at least in part, within the interior cavity 64 of the base 62 and is cooperative in both operation and structure with the vent assembly 60. This is due in part because the access port 66 is disposed in in fluid communication between the interior cavity 64 and the exterior thereof. In one embodiment, the overflow assembly 70 may comprise a valve structure, which is at least partially defined by the access port 66 and a liquid seal member 72. The liquid seal member 72 is movably disposed within the interior cavity 64 of the base 62 and is formed of a material which is capable of floating and/or being disposed by water flow within the interior cavity 64 in an aligned, sealing engagement with an interior opening of the access port 66 upon a filling of the interior cavity 64 by overflow liquid from the housing interior 14.

Therefore, the structural and operative features of the overflow assembly 70 include the movable liquid seal member 72 rising upwardly into the sealing engagement with the access port 66 upon liquid or water passing into the interior cavity 64. It is of note that the configuration of the interior surface of the base cavity 64 may be such as to effectively direct the movable liquid seal member 72 into the aligned, sealing relation to an interior opening of the access port 66, while remaining within the interior cavity 64. Such preferred configuration of the interior surface of the cavity 64 may be spherical, at least partially spherical or be otherwise configured to accomplish such direct, sealing registry and engagement between the liquid seal member 72 and the interior opening of the access port 66.

Moreover, when the vent assembly 60 and the overflow assembly 70 are cooperatively structured and disposed in the manner set forth above, within the interior cavity 64 of the base 62, the overflow assembly 70 as well as a vent assembly 60 are operative with and include a seal member retainer 74. The seal member retainer 74 is disposed within the interior cavity 64 and includes an apertured or otherwise liquid and air permeable construction. Such a fluid permeable construction allows both air and liquid to pass therethrough between the access port 66 and the hollow interior 14 of the housing 12, via the airflow conduit 68 and one or more conduit segments 68'. Such an apertured construction may be the form of a mesh or screen material or otherwise be structured to include sufficiently disposed and dimensioned apertures, which facilitate fluid flow therethrough. However, such an apertured construction, including a plurality of apertures, are dimensioned to be sufficiently smaller, to restrict passage of the movable airflow seal member 72 therethrough into a sealing engagement or position between the interior of the cavity 64 and the housing interior 14.

Therefore, during intended operation of the vent assembly 60 and a concurrent at least partial filling of the housing interior 14 with liquid, air within the housing 12 will flow through the airflow conduit 68 and one or more conduit segments 68' into the interior cavity 64 of the base 62 and outwardly therefrom through the access port 66. Due to a predetermined weight or other structure of the movable seal member 72, the force or pressure exerted thereon by the passage of air through the interior cavity 64, will not be sufficient to establish and maintain a continuous sealing engagement between the liquid seal member 72 and the interior opening of the access port 66. Also because of the apertured construction of the retainer 74, air can freely pass through the retainer 74 into the interior cavity 64 and outwardly therefrom through the access port 66.

However, if an excess amount of water is delivered to the housing interior 14, resulting in an overflow of liquid passing through the airflow conduit 68 and conduit segments 68' into the interior cavity 64, the liquid seal member 72 will float or otherwise be forced into the aforementioned sealing engagement with the access port 66. Such sealing engagement will prevent or significantly restrict the overflow of liquid from passing through the access port 66 from the interior 64 of the base 62, to an exterior thereof.

In contrast, when liquid is removed from the interior 14, air will be drawn from the exterior of the base 62, through the access port 66, into and through the airflow conduit 68 and one or more conduit segments 68' into the housing interior 14. During this emptying procedure the disposition and apertured construction of the retainer 74 will prevent the liquid seal member 72 from passing beyond the retainer 74 into a sealing relation with the airflow conduit 68 of the vent assembly 60. In turn, airflow through the access port 66 and interior of the base 62 will continue into the interior 14 of the housing 12 until the emptying of liquid from the housing 12 is completed.

Therefore, the structure and operative features of the variable density flywheel assembly 10 of the present invention allow the filling of the hollow interior 14 of the housing 12 with different quantities of liquid, thereby allowing the density of the housing to be selectively varied. Such varied density will result in a variable inertia and resulting kinetic energy upon rotation of the housing 12 in accord with the demands and requirements of the practical application (machinery, generator, mechanical linkage, engine, etc.) with which the flywheel assembly 10 of the present invention is operatively associated.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A flywheel assembly having a variable density, said flywheel assembly comprising:
a housing including a hollow interior, a shaft including an interior channel extending along a length thereof, said shaft connected to said housing, a liquid input connected to said shaft and disposed in fluid communication with said hollow interior, a liquid supply connected in fluid communication with said hollow interior, via said liquid input, a control facility connected to said liquid supply and comprising a central processing unit operatively connected to a liquid drive structure, said liquid drive structure including reverse operating capabilities configured to direct said liquid flow into and out of said hollow interior, via said liquid input.

2. The flywheel assembly as recited in claim 1 wherein said housing comprises two housing segments interconnected along adjacently disposed circumferences.

3. The flywheel assembly as recited in claim 2 wherein said circumferences of said two housing segments are interconnected and operatively disposed in a substantially horizontal orientation.

4. The flywheel assembly as recited in claim 2 wherein each of said two housing segments includes a substantially conical configuration interconnected in fluid sealing relation to one another along adjacently disposed circumferences, in a reversed orientation.

5. The flywheel assembly as recited in claim 4 wherein each circumference of said two housing segments comprises a substantially annular configuration.

6. The flywheel assembly as recited in claim 1 wherein said control facility further comprises timer capabilities operative with said central processing unit to determine activation of said liquid flow both into said hollow interior and out of said hollow interior.

7. A flywheel assembly having a variable density, said flywheel assembly comprising:
    a housing including a hollow interior,
    a shaft including an interior channel extending along a length thereof, said shaft connected to said housing,
    a liquid input connected to said shaft and disposed in fluid communication with said hollow interior,
    a liquid supply connected in fluid communication with said hollow interior, via said liquid input,
    a control facility connected to said liquid supply and operative to direct liquid flow into and out of said hollow interior, via said liquid input, and
    a vent assembly connected to said housing in fluid communication with said hollow interior; said vent assembly operative to define airflow out of and into said hollow interior, respectively concurrent to said liquid flow into and out of said hollow interior.

8. The flywheel assembly as recited in claim 7 further comprising a base at least partially defining a portion of said vent assembly, said base including an interior cavity and an access port, said access port disposed in fluid communication with said interior cavity and an exterior of said base.

9. The flywheel assembly as recited in claim 8 wherein said vent assembly further comprises a conduit disposed in fluid communication with and between said interior cavity and said hollow interior of said housing.

10. The flywheel assembly as recited in claim 9 wherein said vent assembly further comprises at least one conduit segment disposed in fluid communication with and between said conduit and said hollow interior.

11. The flywheel assembly as recited in claim 8 further comprising an overflow assembly structured and disposed to restrict overflow of liquid from said hollow interior, through said base, via a remainder of said vent assembly.

12. The flywheel assembly as recited in claim 11 wherein said overflow assembly comprises a seal member movably disposed within said interior cavity and disposable in fluid sealing relation to said access port, concurrent to a filling of said interior cavity with liquid from said hollow interior of said housing.

13. A flywheel assembly having a variable density, said flywheel assembly comprising:
    a housing including a hollow interior and comprising an at least partially conical configuration, said housing including a diameter operatively disposed in a substantial horizontal orientation,
    a shaft including an interior channel extending along a length thereof, said shaft connected to said housing,
    a liquid input connected to said shaft and disposed in fluid communication with said hollow interior,
    a liquid supply connected in fluid communication with said hollow interior, via said liquid input, and
    a control facility connected to said liquid supply and operative to direct liquid flow into and out of said hollow interior, via said liquid input.

14. The flywheel assembly as recited in claim 13 wherein said shaft is disposed in substantially perpendicular relation to said diameter of said housing.

15. The flywheel assembly as recited in claim 14 wherein said shaft is disposed in coaxial relation to a central longitudinal axis of said housing.

16. A flywheel assembly having a variable density, said flywheel assembly comprising:
    a housing including a hollow interior,
    a shaft including an interior channel connected to said housing and rotational therewith,
    a liquid input connected to said housing and disposed in fluid communication with said hollow interior,
    a liquid supply connected in fluid communication with said hollow interior, via said liquid input, and
    a vent assembly connected to said housing in fluid communication with said hollow interior, said vent assembly operative to define airflow out of and into said hollow interior, respectively concurrent to said liquid flow into and out of said hollow interior, via said liquid input.

17. The flywheel assembly as recited in claim 16 wherein said housing comprises two housing segments interconnected along adjacently disposed circumferences, said circumferences of said two housing segments interconnected in fluid sealing relation to one another and operatively disposed in a substantially horizontal orientation.

18. A flywheel assembly as recited in claim 17 wherein said shaft is disposed in substantially perpendicular relation to said adjacent circumferences and in coaxial relation to a longitudinal axis of said housing.

19. The flywheel assembly as recited in claim 16 further comprising an overflow assembly structured and disposed to restrict overflow of liquid from said hollow interior through said vent assembly, to an exterior of said housing.

\* \* \* \* \*